United States Patent [19]

Parr et al.

[11] Patent Number: 5,471,501
[45] Date of Patent: Nov. 28, 1995

[54] ENHANCED DIGITAL COMMUNICATIONS RECEIVER USING CHANNEL IMPULSE ESTIMATES

[75] Inventors: Michael I. Parr, San Diego; John L. Watson, Carlsbad; T. G. Vishwanath, San Diego, all of Calif.

[73] Assignee: Hughes Aircraft Company, Los Angeles, Calif.

[21] Appl. No.: 107,264

[22] Filed: Aug. 13, 1993

Related U.S. Application Data

[62] Division of Ser. No. 722,440, Jun. 27, 1991, Pat. No. 5,263,026.

[51] Int. Cl.$^6$ ........................................... H04L 7/00
[52] U.S. Cl. ..................... 375/354; 375/340; 375/349; 375/232
[58] Field of Search ........................ 375/94, 96, 97, 375/99, 102, 106, 111, 11–15

[56] References Cited

U.S. PATENT DOCUMENTS

| | | | |
|---|---|---|---|
| 4,578,800 | 3/1986 | Yasuda et al. | 375/106 |
| 5,245,611 | 9/1993 | Ling et al. | 375/15 |
| 5,263,026 | 11/1993 | Parr et al. | 375/94 |
| 5,303,263 | 4/1994 | Shoji et al. | 375/94 |

OTHER PUBLICATIONS

Yow–Jong Liu, "Bi–directional Equalization Technique for TDMA Communication Systems over Land Mobile Radio Channels", IEEE, pp. 1458–1462.

*Primary Examiner*—Stephen Chin
*Assistant Examiner*—Don N. Vo
*Attorney, Agent, or Firm*—Gordon R. Lindeen, III; Wanda K. Denson-Low

[57] ABSTRACT

The present invention provides for a receiver that employs integrated symbol timing adjustment and carrier tracking algorithms based on channel impulse response estimates. It uses variable coefficient least mean square tracking during estimation of the transmission channel's impulse response. Maximum likelihood sequence estimation equalization can also be integrated into the system using a non-real time operation that permits and exploits "time-reversed" equalization to significantly enhance bit-error rate performance and permits implementation of all the functions in a reasonably simple receiver.

29 Claims, 6 Drawing Sheets

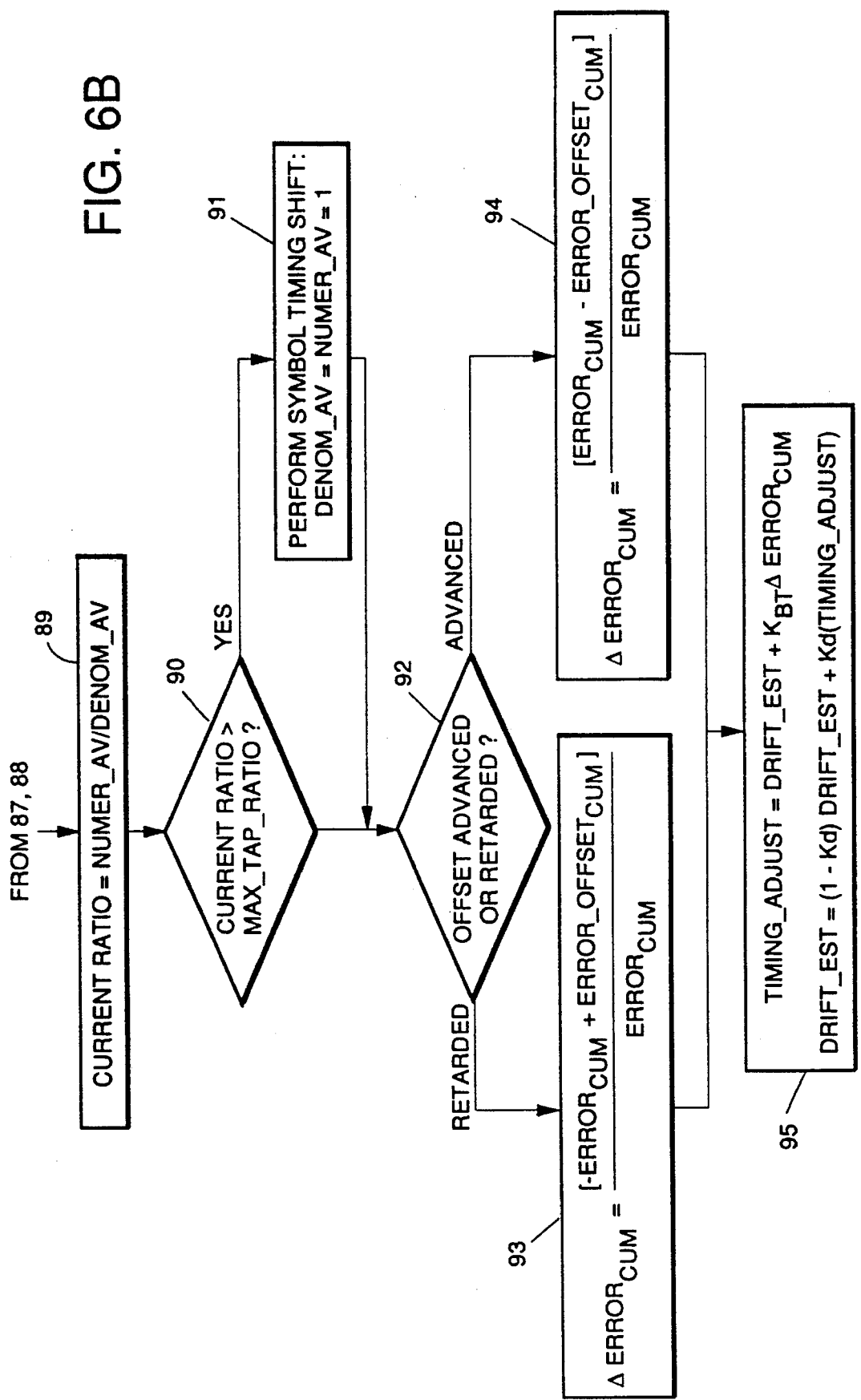

ENHANCED DIGITAL COMMUNICATIONS RECEIVER USING CHANNEL IMPULSE ESTIMATES

This application is a division of U.S. Pat. application Ser. No. 07/722,440, filed Jun. 27, 1991, U.S. Pat. No. 5,263,026, assigned to the same assignee as the present invention.

BACKGROUND

The present invention relates generally to digital cellular communications, and more particularly, to a maximum likelihood sequence estimation based equalization method for use in mobile digital cellular receivers.

Communication channels in the cellular environment commonly impose a combination of distorting effects on transmitted signals. Rayleigh fading, where a signal's perceived power level rises and falls rapidly over a wide range, results from the combination of signals that have traversed paths differing in length by at least a significant fraction of a wavelength (i.e., about 30 cm. for cellular). Differences in path transmission times that approach the time taken to transmit a symbol result in a second problem called delay spread.

Delay spread results in reception of multiple delayed replicas of a transmitted signal. Each Rayleigh faded replica has randomly distributed amplitude and phase, and the rate at which this complex quantity varies is constrained by the Doppler bandwidth associated with a vehicle's speed. In a frequency nonselective environment, the sampled outputs of a receiver's matched falter provides uncorrelated estimates of the transmitted data. As such, in terms of discrete time samples, the channel has exhibited an impulse response proportional to a delta function. With delay spread, on the other hand, the discrete time channel impulse response is extended to introduce energy at a number of symbol times. The effect of the channel on the transmitted signal, in turn, may be viewed as the convolution of the transmitted information with the channel's impulse response. The channel, therefore, emulates a convolutional coding process.

This leads to the possibility of estimating the transmitted information through the use of methods analogous to typical decoding of convolutional codes, i.e., maximum likelihood sequence estimation techniques. Unlike the more widely applied forward error correction decoding environment, the details of the encoding process in a reverse error correction decoding environment, are not known a priori by the receiver. Issues related to the need to estimate the form of the encoding process are addressed by this invention.

For the North American digital cellular system, a number of documents define the standards of implemented components. With respect to this invention, the following are of interest: "Dual-Mode Mobile Station - Base Station Compatibility Standard" denoted here as IS-54, [EIA/TIA Project Number 2398, Rev. A, Jan. 1991] and "Recommended Minimum Performance Standards for 800 MHz Dual-Mode Mobile Stations", denoted here as IS-55, [EIA/TIA Project Number 2216, Apr. 1991].

It would therefore be desirable to provide an enhancement to the processing performed by equalizers for use in mobile telephones that provides for system complexity reduction and that provides for better performance in a fading channel.

SUMMARY OF THE INVENTION

The present invention provides for an equalization method that forms the nucleus of a receiver for digital cellular mobile telephones. A number of distinct aspects of the design are considered novel, including: non-real time operation mode that permits and exploits "time-reversed" equalization, which significantly enhances bit error rate performance; the use of maximum likelihood sequence estimation; use of variable coefficient least mean square tracking during estimation of the transmission channel's impulse response; and integrated symbol timing adjustment and carrier tracking algorithms.

More particularly, the present invention comprises a method of processing received symbols including known preamble data and transmitted data, which method compensates for the effects of a power fade caused by a frequency selective fading channel. One specific aspect of the present invention comprises a method of processing samples received from a delay-spread, fading channel, which samples are associated with a block of data transmitted within a time slot, and wherein the method is adapted to make data decisions, and comprises the following steps: (1) Storing samples received during the time slot; (2) Estimating the location within the time slot at which decision errors are most probable, by determining the location in time of the maximum fade depth in the transmission channel impulse response; (3) Processing the stored samples, starting with the first received sample and proceeding beyond the location of the maximum fade depth, using a predetermined maximum likelihood sequence estimation procedure to generate estimates of the transmitted data; (4) Processing the stored samples, starting with the final received sample and proceeding in a reverse direction with respect to the time sequence in which the samples were stored, beyond the abovedetermined location, using the maximum likelihood sequence estimation process to generate estimates of the transmitted data; (5) Simultaneous with the above two processing steps, generating estimates of the characteristics of the transmission channel impulse response, which are used in the maximum likelihood sequence estimation process; (6) Processing the output of the preceding estimate generating steps to generate data decisions.

The step of generating the channel impulse response estimates typically comprises using variable tap coefficients that are determined by estimating tap settings within the estimated channel impulse response by minimizing the square of the difference between actual received samples and those synthesized by passing known transmitted signals through the estimated channel. The processing is done in an iterative manner by combining previous estimates of channel impulse response and new estimates thereof based on recent information, and by varying the ratio of the contributions from the previous and new estimates as a function of location within the time slot.

The method may further comprise a symbol timing adjustment procedure comprising the following steps: (1) Using a subset of the samples received during a time slot, generating an error measurement comprising a measure of the degree to which the estimated channel impulse response matches the actual channel impulse response; (2) Generating a plurality of similar measures utilizing simultaneously recorded samples having different time offsets wherein at least one sample is advanced and one sample is retarded in time relative to the above measure; (3) Searching for a bit time setting that minimizes the above error measurement and adjusting the sampling to reflect the newly determined bit time setting.

The method may also further comprise a carrier offset tracking method comprising the following steps: (1) Recording at least two samples of at least one tap within the estimated channel impulse response at selected symbol locations within the time slot during the equalization process; (2) Generating frequency offset estimates at each of a plurality of time slots by observing the phase difference in each time slot between the at least two samples; (3) Combining this plurality of frequency offset estimates by using a filtering process to generate a precise frequency offset estimate; (4) Adjusting a controllable frequency source to compensate for the precise frequency offset estimate.

Also, the present invention also uses a forward maximum likelihood estimation method of processing samples received from a delay-spread, fading channel, which is adapted to make data decisions. This method comprises the following steps: Storing samples received during the time slot; Processing the stored samples, starting with the first received sample and proceeding beyond the last received sample of the time slot using a predetermined maximum likelihood sequence estimation procedure to generate estimates of the transmitted data; Simultaneous with the above processing, generating estimates of the characteristics of the transmission channel impulse response which are used in the maximum likelihood sequence estimation process; Processing the outputs of the preceding steps to generate data decisions.

The maximum likelihood sequence estimation method offers significant performance advantages when compared with alternative equalization options, such as decision feedback equalization, for example. With respect to meeting industry defined standards for performance of digital cellular telephones used in fading environments, the performance of the equalizer incorporating the maximum likelihood sequence estimation process of the present invention stands out as superior. It is the only known process that is capable of meeting, or even approaching, the current digital cellular mobile telephone specifications. Time reversed operation further enhances performance and permits implementation with reasonable complexity of a standards compliant mobile receiver.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIGS. 6A and 6B are flow diagrams illustrating the processing performed by the equalizer of the present invention to implement bit timing.

DETAILED DESCRIPTION

Figure 1:
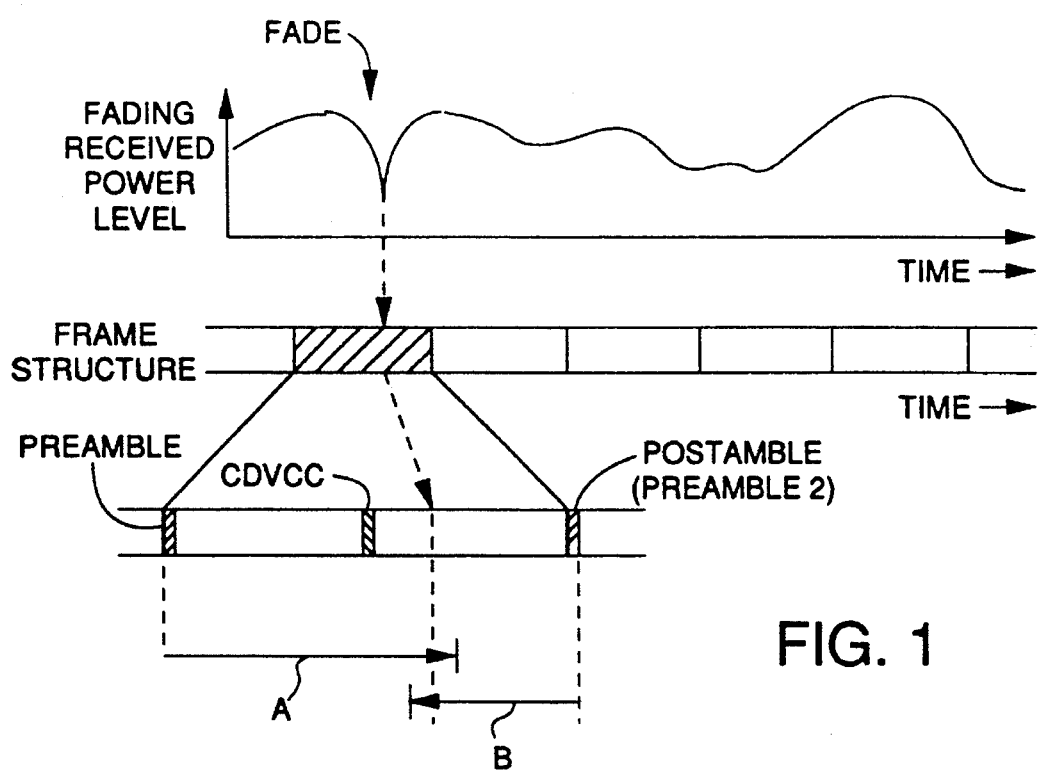
FIG. 1 illustrates the problem associated with reception in a mobile environment with a fading channel and one aspect of the solution provided by the present invention.

Referring to the drawing figures, FIG. 1 illustrates the problem associated with reception in a mobile environment having a fading channel and one aspect of the solution provided by the present invention. FIG. 1 shows a graph showing received power level from a typical fading channel versus time. The location of the power fade is shown relative to a typical time slot. The time slot is shown enlarged and includes a preamble and a coded digital verification color code field (CDVCC), which comprise known data that is used to initialize a receiver system employing the equalizer of the present invention. At the lowest portion of FIG. 1, equalization processing in accordance with the present invention is illustrated with the arrows "A" and "B", in which the equalizer of the present invention processes forward and time reversed computations through the location of the power fade in order to accomplish the objectives of the present invention. This will be more fully described below with reference to FIGS. 2 and 3.

Figure 2:
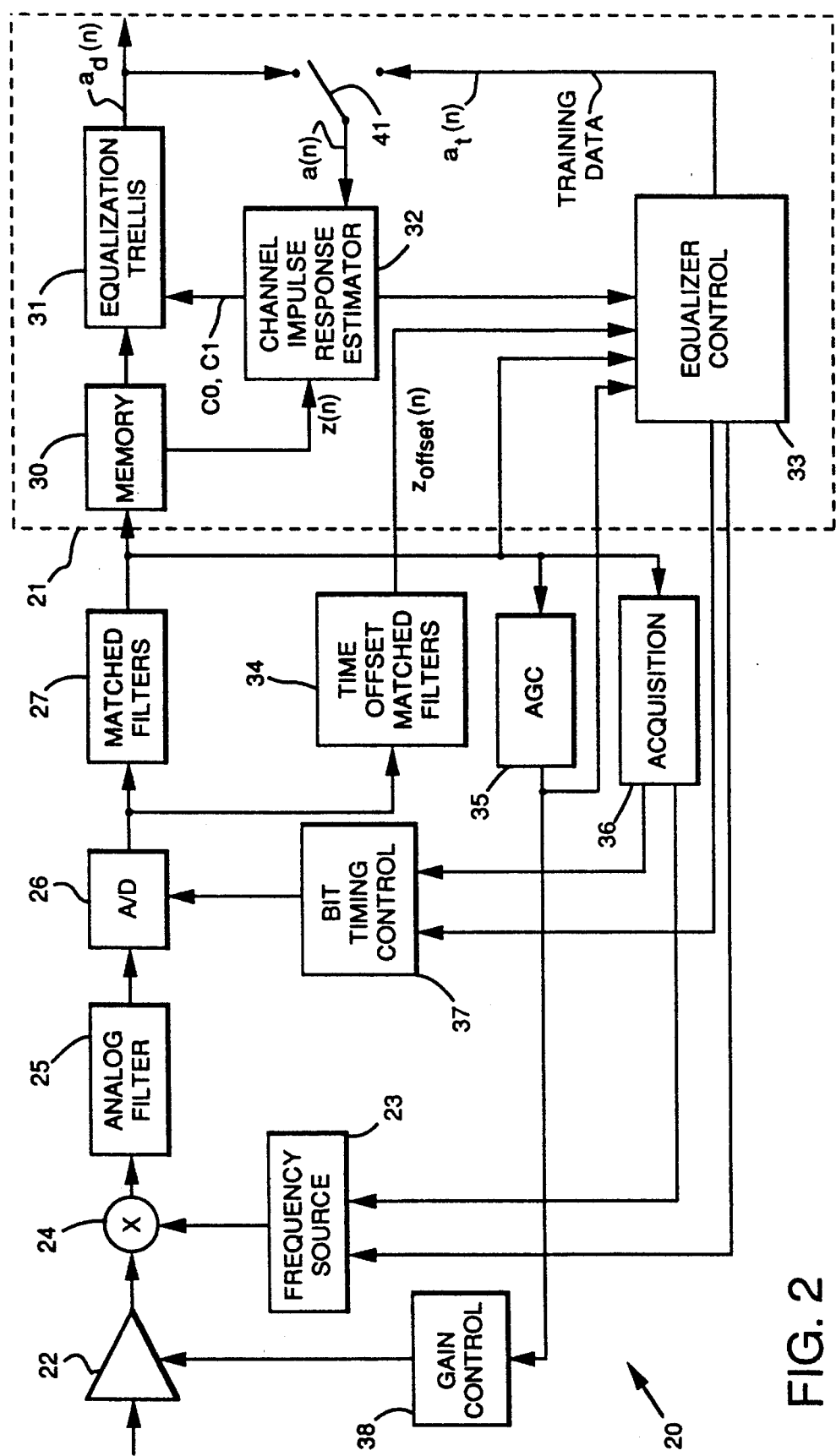
FIG. 2 is a block diagram of a digital cellular mobile telephone receiver incorporating a maximum likelihood sequence estimation based equalizer in accordance with the principles of the present invention.

FIG. 2 is a block diagram of a digital cellular mobile telephone receiver system 20 incorporating a maximum likelihood sequence estimation based equalizer 21 in accordance with the principles of the present invention. The system 20 comprises an amplifier 22 whose output is coupled by way of a downconverter, comprising a frequency source 23 and a mixer 24, to an analog filter 25. An analog to digital converter 26 is coupled to the analog filter 25 in order to digitize the downconverted data. A matched filter 27 is coupled between the analog to digital converter 26 and the equalizer 21 of the present invention. The equalizer 21 comprises a memory 30, a 4-state equalization trellis 31 that is adapted to calculate maximum likelihood sequence estimation metrics, a channel impulse response estimator 32, and an equalizer control circuit 33.

A serially coupled AGC circuit 35 and gain control circuit 38 are coupled to the amplifier 22. The equalizer control circuit 33 is coupled to an output of the matched filters 27 and is coupled to an input to the frequency source 23. Symbol sampling (bit timing) time control circuitry 37 is coupled to the equalizer control circuit 33 and the acquisition circuit 36 and provides control signals to the analog to digital converter 26. The output of the matched filters 27 is coupled to the AGC circuit 35 and the acquisition circuit 36 and to the equalizer control circuit 33 that is employed to control the frequency source 23 and provide training data for use in initializing the equalizer 21.

In operation, a partially filtered IF signal with a center frequency of 85.05 MHz enters the gain controllable amplifier 22. The resulting signal is then downconverted using the frequency source 23 and the mixer 24 to 461.7 kHz. This signal is then filtered using a narrow analog filter 25 to reject most of the received signals outside the 30 kHz band of interest. The resulting signal is then sampled and converted to 8-bit digital samples using the analog to digital (A/D) converter 26. A 16 tap fractionally spaced digital FIR filter 27 then performs matched filtering to produce symbol spaced samples which enter the equalizer 21. Temporally offset matched filters 34 that are substantially the same as the matched filters 27 are provided for use by the symbol timing control circuit 37, via the equalizer control circuit 33.

The principles of maximum likelihood sequence estimation employed in the equalizer 21 have been described in technical literature starting in the early 1970's. A useful outline is found in "Adaptive Maximum-Likelihood Receiver for Carrier-Modulated Data Transmission Systems", by G. Ungerboeck, IEEE Trans. on Communications, Vol. COM-22, pp. 624–636, May 1974. Another description of the maximum likelihood sequence estimation technique is provided in the reference "Digital Communications - 2nd Edition.", by J. G. Proakis, 1989, pp. 610–642.

The maximum likelihood sequence estimation process is outlined as follows. The channel has an impulse response containing significant energy in, say, N symbols. Assume that the transmitter sends a sequence of symbols, much longer than N. The transmitted sequence may be described as the transitions between states, where each state corresponds to a group of N- 1 transmitted symbols. The states, therefore, correspond to overlapping groups of transmitted symbols. In consecutive states, therefore, all but one constituent symbol are the same, and the possible transitions between states are correspondingly constrained. As each sample is received, the equalization trellis 31 considers every possible sequence of N symbols that could have contributed to its value, by convolving that sequence with the estimated channel impulse response. For each hypothesized sequence, the result of the convolution corresponds, or fails to correspond, in some way (defined by a statistic called a metric) to the measured sample. On an individual basis, the hypothesized sequence with the closest match to the measured sample (the best metric) is the most likely to have been transmitted. However, over many samples and under the constraint that only certain state transitions are possible, the path (sequence of states) with the minimum cumulative metric has maximum likelihood, and this is what the decoder selects.

The system 20 has no a priori knowledge of the form of the encoder employed in the transmitter. Performance of the equalizer 21 therefore depends on the accuracy of the estimate of the encoder's state, the channel impulse response (CIR). FIG. 2 also shows the signals used in estimating the channel impulse response. The objective is to estimate the form of the transversal finite impulse response filter that would take as its input the transmitted information symbols $\{a(n)\}$, and produce at its output the samples taken from the matched filter, $\{z(n)\}$. During the transmission of preambles and coded digital verification color codes, the receiver knows the values of $\{a(n)\}$. However, at other times, only the estimated values $\{a_d(n)\}$ are available for use in the channel impulse response estimation process. This dependence leads to a significant perfor- mance-degrading possibility. If decision errors emerge from the equalizer, and these are then used to update the estimate of the channel impulse response, then further decision errors become more probable leading in a circular fashion to further decision errors and breakdown of the equalization process. This phenomena is referred to as a "channel impulse response tracking breakdown". Such difficulties are most likely to arise at the periods of minimum signal-to-noise ratio, or when the received signal power is at its minimum during reception of a slot.

Within the IS-54 standard, which describes the interface between mobile and base equipment for North American digital cellular systems, each information time slot is preceded by a known sequence, designated as the "preamble". As viewed by the receiver, therefore, information in the time slot is bounded on both sides by known sequences; the preamble for this slot and the preamble for the subsequent slot. Consequently, this equalizer 21 is adapted to mitigate the effects of a channel impulse response tracking breakdown. By finding the most probable instant at which the problem might occur, equalizer operation approaches that instant from both forward and a time-reversed directions, both of which begin with known information sequences that are useful for training. Assuming that a channel impulse response tracking breakdown occurs, this approach minimizes the number of affected symbols by predicting the failure point and avoiding equalization beyond that point.

At 100 km/hr, which is the maximum speed specified in IS-55, which describes the mobile unit minimum performance requirements, the average time between fades are on the order of 12 milliseconds. Given time slot durations of about 6.7 milliseconds, there is only a small possibility of two significant fades occurring within a time slot. However, very close to the center of the slot is the coded digital verification color code field. Even after a channel impulse response tracking breakdown, the channel impulse response estimator 32 is very likely to recover during processing of the coded digital verification color codes due to the certainty of the transmitted data. Hence, the underlying period for which multiple fades are a concern is around 3.5 milliseconds. The chance of more than one deep fade occurring during this time is very low. Consequently, time-reversed equalization improves bit error rate performance in the digital cellular environment.

The present equalizer 21 uses a 4-state architecture, corresponding to N=2, where N is the length of the estimated channel impulse response. This choice assumes that the energy in two (symbol-spaced) samples of the channel's impulse response dominates. To avoid channel impulse response tracking breakdown problems, reverse equalization is used for those symbols following the minimum power point in a received time slot.

Figure 3:
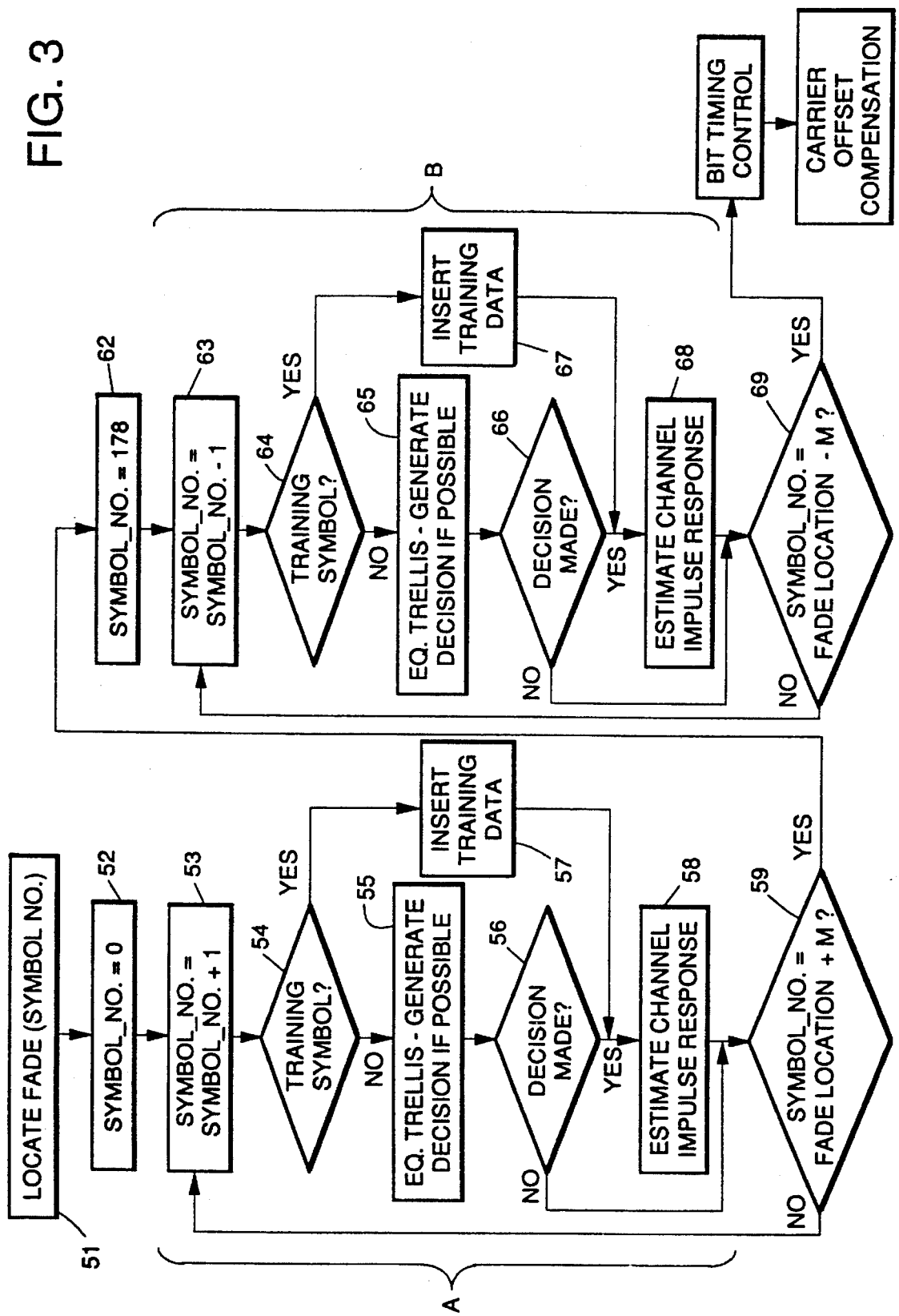
FIG. 3 shows the processing performed in the maximum likelihood sequence estimation based equalizer of FIG. 2.

More specifically, FIG. 3 shows the processing performed in the maximum likelihood sequence estimation based equalizer 21 of FIG. 2. The first step involves finding the location of the power fade (box 51) in terms of symbol number. Processing starts in the forward direction toward the location of the power fade. The symbol number is set to 0 (box 52), and then incremented (box 53). A decision is made whether the symbol then processed is a training symbol (box 54). If the symbol encountered is a training symbol, then training data is inserted (box 57). If a training symbol is not processed, then the equalization trellis is employed to generate metrics and, if possible, a decision (box 55). This is accomplished using equations outlined below. Then it is determined if a decision has been made (box 56). If a decision has been made, then an estimate of the channel impulse response is generated (box 58). If the decision is not made, or once the channel impulse response estimate has been generated, then the symbol number is compared to the location of the power fade plus a predetermined number of additional symbols (box 59). Processing is then repeated by incrementing the symbol number (box 53) and repeating steps (boxes 54–59) until the fade location plus a predetermined number of additional symbols has been reached.

Once the desired symbol location is reached in (box 59), then processing is performed in the reverse direction starting with the preamble of the next succeeding time slot, namely symbol number 177, for example. The symbol number is set to 178 (box 62), and then decremented (box 63). A decision is made whether the symbol then processed is a training symbol (box 64). If the symbol encountered is a training symbol, then training data is inserted (box 67). If a training symbol is not processed, then the equalization trellis is employed to generate branch metrics and a decision (box 65). This is accomplished using the equations outlined below. Then it is determined if a decision has been made (box 66). If a decision has been made, then an estimate of the channel impulse response is generated (box 68). If the decision is not made, or once the channel impulse response estimate has been generated, then the symbol number is compared to the location of the power fade less a predetermined number of additional symbols (box 69). Processing is then repeated by decrementing the symbol number (box 63) and repeating steps (boxes 64–69) until the fade location less a predetermined number of additional symbols has been reached.

More particularly, and in operation, samples entering the equalizer 21 may be identified as z(n), and the output decisions may be identified as a(n). The probability of correctness of a(n) depends on location within the bursts. When a(n) is known with certainty the values of a(n), denoted at(n), are used by the channel impulse response estimator 32 for training. At other times, the best estimate of a(n) is the output of the traceback decision process of the equalization trellis 31, denoted $a_d(n)$.

The equalization trellis 31 operates as follows. Equalization proceeds in the forward direction from the beginning of the preamble up until M symbols after the minimum power symbol. In the reverse direction, the same occurs with processing continuing M symbols beyond the minimum power point. This overlap ensures that trace-back through the trellis in all likelihood converges to a single path by the minimum power point.

Traceback for actual decisions does not occur until the completion of the equalization process. In addition to final traceback, however, there is a need for tentative decisions during equalization, to provide data estimates for the channel impulse response estimation to remain current. A trade-off in determining these tentative decisions arises (a) because the more up-to-date the information is, the more up-to-date the channel impulse response estimate can be (remembering that the channel is far from stationary at high speeds), and (b) the higher the number of symbols that are considered before tentative decisions are made, the more accurate the decisions will be; and hence, the lower the probability that errors are introduced into the channel impulse response estimation. In the case of 4-state equalization there is very little sensitivity to the number of constraint lengths of delay introduced.

Branch metrics are calculated in the equalizer 21 using the following equation:

$$br \text{ metric}[z(k), app\_state(l)] = \left| z(k) - \sum_{n=0}^{1} C_n(k) \times a_h(l,n) \right|^2$$

where app_state(l) represents a hypothetical state in combination with potential input data; $a_h(l,n)$ is a corresponding transmitted signal (constellation point), C represents the current estimate of the channel's impulse response, and z is the measured output of the matched filter 27.

The channel estimator 32 utilizes a second order least mean square algorithm to determine the coefficients of the transversal filter 27 that is an estimate of the channel.

$$C_{S0}(k+1) = C_{S0}(k) + K_1 \left[ z(k) - \sum_{n=0}^{1} C_n(k) \times \hat{a}(k-n) \right] \hat{a}^*(k)$$

$$C_{S1}(k+1) = C_{S1}(k) +$$

$$K_1 \left[ z(k) - \sum_{n=0}^{1} C_n(k) \times \hat{a}(k-n) \right] \hat{a}^*(k-1)$$

-continued $$C_0(k+1) = C_0(k) + C_{S0}(k+1) +$$

$$K_2 \left[ z(k) - \sum_{n=0}^{1} C_n(k) \times \hat{a}(k-n) \right] \hat{a}^*(k)$$

$$C_1(k+1) = C_1(k) + C_{S1}(k+1) +$$

$$K_2 \left[ z(k) - \sum_{n=0}^{1} C_n(k) \times \hat{a}(k-n) \right] \hat{a}^*(k-1),$$

where $C_0(k)$ and $C_1(k)$ are complex values of estimated channel impulse response taps, $C_{S0}(k)$ and $C_n(k)$ are complex intermediate values related to the estimated channel impulse response taps, permitting second order operation, $K_1$ and $K_2$ are the real gain values controlling the tracking rate of the channel impulse response estimation process, z(k) are complex symbol spaced sampled outputs of the receiver matched filter, and a(k) are complex estimated or known values of transmitted symbols.

The values $K_1$ and $K_2$ within these equations control the rate of adaptation, and (conversely) the sensitivity to noise and decision errors. Consequently, to minimize the error rate, a trade-off between ability to track changes in the channel and degradation in performance due to imperfect input information is needed to optimize the values of $K_1$ and $K_2$. The optimal values of $K_1$ and $K_2$ vary as a function of instantaneous signal to noise ratios, and thus as a function of depth of fade. Therefore, algorithms for modifying the values during each burst have been evaluated, with considerable improvement in performance relative to that achievable with constant settings.

One approach for modifying $K_1$ and $K_2$ has provided good performance and is as follows:

1. Set the values of $K_1$ and $K_2$ that will apply aat the symbol determined to correspond to the deepest fade; $K_1$_fade.

2. Adjust each value linearly (with preset slope - $K_1$_slope and $K_2$_slope) to reach the selected values at the fade location using:

before forward processing - initialize
$K_1 = K_1$_fade$-K_1$_slope·fade_location
$K_2 = K_2$_fade$-K_2$_slope·fade_location before reverse processing - initialize
$K_1 = K_1$_fade$-K_1$_slope·(177–fade_location)
$K_2 = K_2$_fade$-K_2$_slope·(177–fade_location)

during processing - as each symbol is processed
$K_1 = K_1 + K_1$_slope
$K_2 = K_2 + K_2$_slope, where $K_1$_jade is the real value of $K_1$ at the symbol with the maximum estimated fade depth, $K_2$_is the real value of $K_2$ at the symbol with the maximum estimated fade depth, $K_1$_slope is the real increment in $K_1$ applied during processing of each symbol, $K_2$_slope is the real increment in $K_2$ applied during processing of each symbol, and fade_location is the symbol number at the maximum estimated fade depth, and last_location is the symbol number of the final symbol.

Estimation of the location of the power fade entails use of the received symbols from the matched filter 27, and the settings on the AGC circuit 35 that were active during reception of those symbols. As the response of the amplifier 22 to the AGC circuit settings is effectively instantaneous, the primary delays in utilizing this information arise in the matched filter 27. This filter 27 is a linear phase filter (constant delay), so the available input information can be easily transformed into an accurate estimate of the envelope power. This envelope is averaged by a rectangular IIR filter over about ten (10) symbol times, with very good performance.

After completion of acquisition, the carrier frequency offset should be less than 200 Hz. To operate without impairment, this offset should be on the order of 20 Hz or less. Thus, estimation of and correction for carrier offset must continue after acquisition. The method employed utilizes the fact that when frequency offset occurs, the taps of the channel impulse response will rotate consistently at a rate proportional to the offset. Changes in tap phases over fixed periods, therefore, provide an observable characteristic to apply to frequency control. Note that random phase changes occur in addition to these consistent rates of change, so filtering is used to extract the frequency offset. In practice, offsets of around 1000 Hz can be resolved although the maximum expected offset after acquisition is 200 Hz. The approach used is as follows:

1. During the reception of each burst, the half of that burst that does not include the deepest fade is selected for tracking. This scheme is aimed at avoidance of the very high rates of change in phase that typically accompany transitions through low signal amplitudes.

2. Two samples of each of the two estimated channel impulse response taps are recorded: just after the preamble (or leading into the postamble if the fade occurred during the first half of the slot), and 20 symbols later (or 20 symbols earlier). At a symbol rate of 24300 symbols per second, a 100 Hz offset would result in an average rotation of 29.6 degrees during the 20 symbol period. For any rotation in excess of 180 degrees, the observed rotation would be less than 180 degrees but in the opposite direction. This aliasing could impact performance for frequency offsets above about 300 Hz. In typical operation, however, the detriment to performance resulting from such aliasing has proved minimal, due to the anti-aliasing filtering inherent in the tracking. The selection of a sampling window of 20 symbols was based on concern about this aliasing. Otherwise, a longer window would improve noise immunity.

3. From information determined during the bit timing fine tuning, the dominant tap is selected. Using the recorded settings for this tap, a phase change is calculated, yielding an estimate of the frequency offset.

4. These estimates are then filtered over many bursts to reduce the "noise" that arises primarily due to the random (zero mean) presence of Doppler offsets and Gaussian noise. The filter output provides an estimate of the carrier offset and can be used to directly update the frequency control hardware. The offset is given by:

$$f\_offset\_estimate_{k+1} = (1-K_{fo})f\_offset\_estimate_k + K_{fo}f\_req\_observed,$$

where freq_observed is derived from the observed phase change, the constant $K_{fo}$ controls the convergence rate of the estimation process, $f\_offset\_estimate_k$ is the estimated frequency offset at frame "k", and $K_{fo}$ is a constant controlling the convergence rate of the frequency tracking. If f_offset_estimate reaches half the resolution of the frequency source, then a step in frequency is applied, e.g., if the resolution is 20 Hz and f_offset_estimate exceeds 10 Hz, then a 20 Hz change in reference is applied. At the same time f_offset_estimate is reinitialized.

Figure 5:
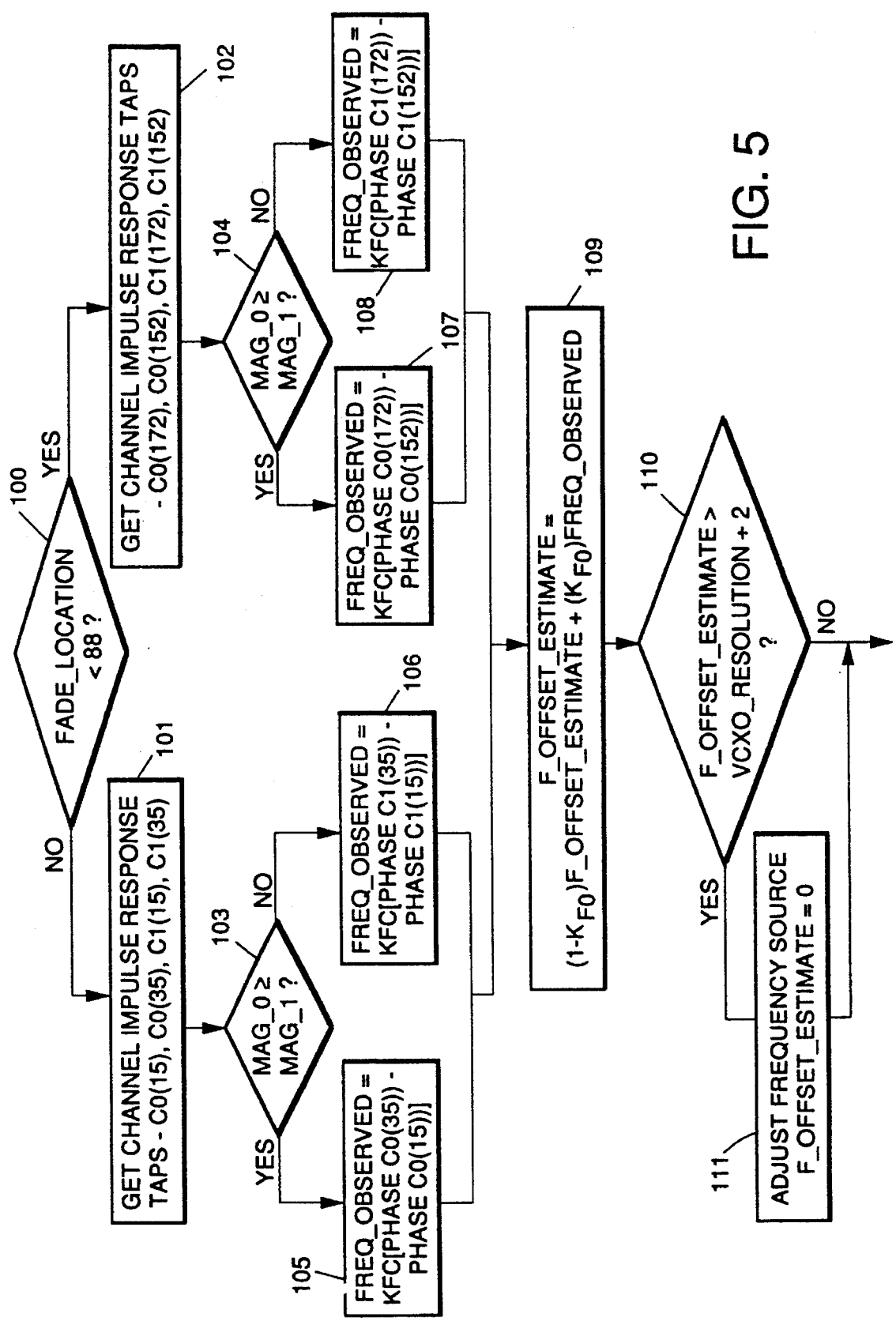
FIG. 5 is a flow diagram illustrating the processing performed by the equalizer of the present invention to implement carrier frequency offset compensation.

Referring to FIG. 5, it illustrates a flow diagram showing the processing performed by the equalizer 20 to implement carrier frequency offset compensation. Utilizing an already located fade, a decision (box 100) is made as to whether to use the first or second half of the received slot for frequency offset estimation. Based on this decision, samples are taken twenty symbols apart in the appropriate half of the slot (boxes 101,102). For the selected case, individual taps are compared and the larger is chosen (decisions 103, 104). The phases of the chosen tap at the selected two times are then subtracted (boxes 105–108) to produce "freq_observed", a noisy estimate of the offset. This is filtered (box 109) to generate an accurate estimate of the offset. If an adjustment in setting of the frequency control would reduce this offset, then a decision is made to do so (decision 110); and the decision is then implemented (box 111).

The equalizer is reasonably insensitive to errors in bit timing. However, for the following reasons, symbol timing adjustments continue during equalizer operation. The initial estimate produced by acquisition may differ sufficiently from optimal timing so that performance would benefit from adjustment. The transmit and receive symbol timing clocks may differ by about 5 ppm, resulting in drift of about 0.1 μS per frame (or a symbol every 8 seconds). This drift must be compensated for. In practice, individual independently-delayed signal paths will randomly rise and diminish in average strength, resulting in situations that would be best catered for by different symbol timing. Optimal symbol timing depends on an ability to track these changing situations.

Figure 4:
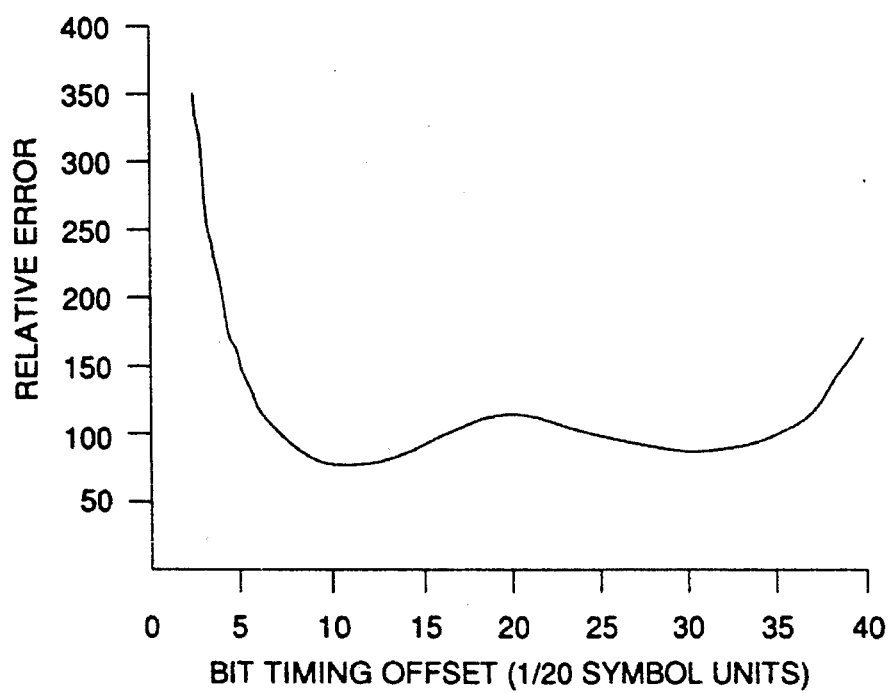
FIG. 4 illustrates a graph of relative error versus bit timing offset that illustrates one problem overcome using the maximum likelihood sequence estimation based equalizer of the present invention.

The operation of the symbol timing control is as follows. The approach has similarities to the early-late gating schemes frequently employed in direct-sequence spread spectrum receivers. As each burst is received, a measure of the error between the expected preamble and the actual received preamble is generated. In addition, in alternating frames, similar measures are made on time advanced and retarded versions of the same input samples. If no timing adjustment is necessary, the error generated with the existing timing should be less (on average) than either of the others. Adjustments are made when this is not the case or there is a consistent disparity between the advanced and retarded error estimates. This process is simply a search for bit timing that minimizes the error statistic, as illustrated in FIG. 4. The control loop used includes an estimator of any consistent change in timing, corresponding to drift with respect to the transmitter. Drift in the order of 10 ppm can be compensated for by this loop.

This search for a minimum may be hampered by the possible presence of a local (non-global) minimum. In fact, for this statistic the presence of two minima is common (corresponding to the two taps implicit in the equalizer structure - see FIG. 1 ). The approach taken to resolve this conflict is as follows. The more advanced minimum is presumed to be the preferred sampling time. Multiple minima typically arise when there is a small level of delay spread, i.e., less than about 10 μS. Under such conditions the ratio of magnitudes of the estimated paths in the (symbol-spaced) channel impulse response differs significantly in the region of the more advanced minimum from that in the more retarded case. Thus, the ratio of tap magnitudes provides a statistic from which to conclude the appropriateness of a selected minimum.

Figure 6A:
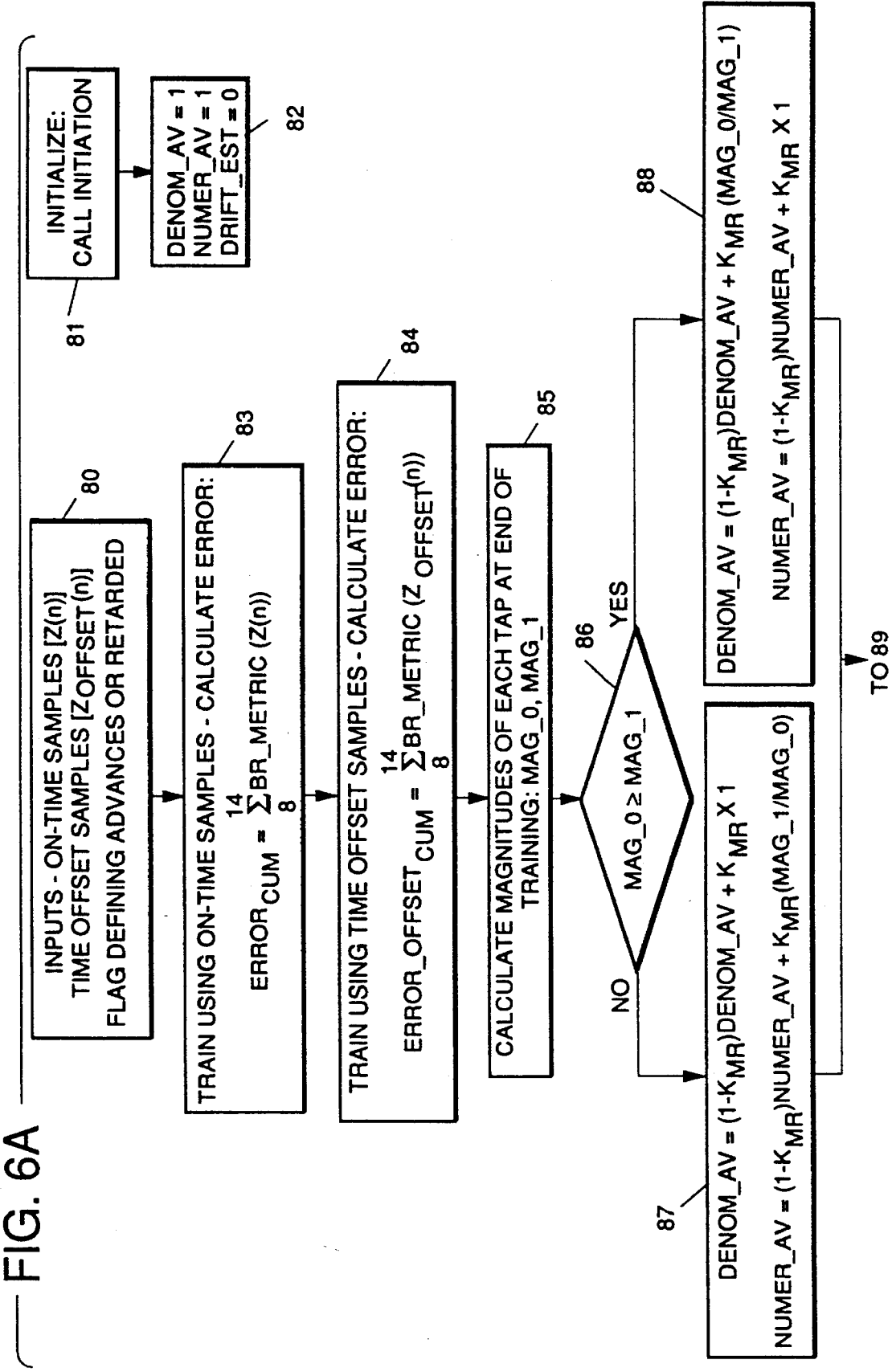

With reference to FIGS. 6A and 6B they show flow diagrams illustrating the processing performed by the equalizer 20 to implement bit timing control. Inputs (box 80) include the on-time and time-offset samples (z (n) and z offset(n)), and a flag to indicate the direction of the time offset. The on-time samples are fed into the equalizer 20 just as they are during normal training 83. Similarly, the time offset samples are fed to the equalizer 20 (box 84). In both cases, the branch metrics (on the known correct paths) are accumulated over the latter symbols to provide measures (ERROR$_{cum}$ and ERROR OFFSET$_{cum}$) of the degree to which the samples match expectations.

In a separate process the magnitudes of each of two taps estimated as the channel impulse response at the end of the training process are calculated (box 85). Averaging the ratio of these taps over a number of frames (boxes 86–89) permits a judgement to be made as to whether the bit timing has selected an inappropriate local minimum. If a threshold (box 90) is reached, then bit timing will be advanced by a full symbol time (box 91). Taking account of the relative time at which samples were taken (box 92), the ERROR$_{cum}$ and ERROR OFFSET$_{cum}$ measures are combined to generate a noisy estimate of an appropriate timing adjustment (boxes 93, 94). This estimate is then filtered (box 95) to generate an actual timing offset adjustment. To compensate for consistent drift, an additional term "drift_est" monitors and compensates for this effect.

Thus there has been described a maximum likelihood sequence estimation based equalization method for use in mobile digital cellular receivers. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. In a digital communications receiver in which signals received sequentially within time slots of a transmission channel, having a carrier and an impulse response are sampled, a method for adjusting timing of the signal sampling and for tracking offset of the transmission channel carrier comprising the steps of:

storing samples of the sequentially received signals in a time sequential manner;

generating transmission channel impulse response estimates associated with the stored samples, the estimates having associated taps;

generating from the samples an error measurement comprising a first measure of the degree to which a channel impulse response estimate matches the actual channel impulse response;

determining a sample time setting that minimizes the above error measurement and adjusting the timing of the signal sampling in accordance with the newly determined sample time setting;

recording at least two samples of at least one tap of a channel impulse response estimate at at least one selected location within a time slot;

estimating the location within the time slot at which any fade in power received over the channel is a maximum; the time slot having a preamble and a postamble;

during the reception of each time slot, selecting the half of the time slot that does not include the estimated location of maximum power fade;

recording two samples of each of two taps of the channel impulse response estimates, the first tap being just after the preamble or in the postamble, depending upon the estimated location of maximum power fade, and the second tap being a predetermined number of symbols later or earlier, depending upon the estimated location of maximum power fade;

selecting a dominant tap;

using recorded settings for the selected dominant tap, calculating a phase change, yielding an estimate of the frequency offset;

filtering the estimate of the frequency offset over many time slots to generating an estimate of the offset of the transmission channel carrier adapted for use as a feedback signal to adjust carrier tracking; and adjusting a controllable frequency source to track the offset of the transmission channel carrier using the feedback signal.

2. The method of claim 1 wherein the step of determining a sample time setting comprises generating a plurality of measures similar to the first measure of the degree to which the estimated channel impulse response matches the actual channel impulse response utilizing simultaneously recorded samples having different time offsets wherein at least one sample used for each of the plurality of measures is advanced in time and one sample used for each of the plurality of measures is retarded in time relative to the samples used for generating the first measure, and further comprising filtering the plurality of measures.

3. The method of claim 1 wherein the step of generating channel impulse response estimates comprises using variable tap coefficients that are determined by estimating tap settings for the estimated channel impulse response by minimizing the square of the difference between actual received samples and those synthesized by passing known transmitted signals through the estimated channel, and wherein the processing is done in an iterative manner by combining previous estimates of channel impulse response and new estimates thereof based on recent estimates, and by varying the ratio of the contributions from the previous and new estimates as a function of location within the time slot.

4. The method of claim 3 wherein the values of coefficients $K_1$ and $K_2$ are varied as a function of symbol location (k) by solving the following equations for (k+1) and $C_1(k+1)$:

$$C_{S0}(k+1) = C_{S0}(k) + K_1 \left[ z(k) - \sum_{n=0}^{1} C_n(k) \times \hat{a}(k-n) \right] \hat{a}^*(k)$$

$$C_{S1}(k+1) = C_{S1}(k) + K_1 \left[ z(k) - \sum_{n=0}^{1} C_n(k) \times \hat{a}(k-n) \right] \hat{a}^*(k-1)$$

$$C_o(k+1) = C_0(k) + C_{S0}(k+1) + K_2 \left[ z(k) - \sum_{n=0}^{1} C_n(k) \times \hat{a}(k-n) \right] \hat{a}^*(k)$$

$$C_1(k+1) = C_1(k) + C_{S1}(k+1) + K_2 \left[ z(k) - \sum_{n=0}^{1} C_n(k) \times \hat{a}(k-n) \right] \hat{a}^*(k-1),$$

where $C_0(k)$ and $C_1k$ are complex values of estimated channel impulse response taps, $C_{s0}(k)$ and $C_n(k)$ are complex intermediate values related to the estimated channel impulse response taps, permitting second order operation, $K_1$ and $K_2$ are the real gain values controlling the tracking rate of a channel impulse response estimation process, $z(k)$ are complex symbol spaced sampled outputs of the receiver matched filter, and $a(k)$ are complex estimated or known values of transmitted symbols.

5. The method of claim 1 wherein the step of combining the frequency offset estimates comprises applying f_offset_estimate$_{k+1}$=(1−K$_{fo}$) f_estimate$_k$+K$_{fo}$freq_observed, where freq_observed is derived from the observed phase change, the constant K$_{fo}$ controls the convergence rate of the estimation process, f_offset_estimate$_k$ is the estimated frequency offset at time slot "k", and $K_{of}$ is a constant controlling the convergence rate of the frequency tracking.

6. A digital communications receiver in which signals received sequentially within time slots of a transmission channel having a carrier and an impulse response are sampled comprising:

a memory for sorting samples of the sequentially received signals in a time sequential manner, each sample having an associated phase;

a channel impulse response estimate generator coupled to the memory;

means coupled to the memory for generating from the stored samples an error measurement comprising a first measure of the degree to which a channel impulse response estimate matches the actual channel impulse response;

a second memory for recording at least two samples of at least one tap of a channel impulse response estimate at at least one selected location within a time slot;

a fade locator for estimating the location within the time slot at which any fade in power received over the channel is a maximum the time slot having a preamble and a postamble;

means for selecting the half of the time slot that does not include the estimated location of maximum power fade wherein the second memory records two samples of each of two taps of the channel impulse response estimates, the first tap being just after the preamble or in the postamble, depending upon the estimated location of maximum power fade, and the second tap being a predetermined number of symbols later or earlier, depending upon the estimated location of maximum power fade;

a dominant tap selector;

means for using recorded settings from the second memory for the selected dominant tap, calculating a phase change, yielding an estimate of the frequency offset; and a frequency offset filter for filtering the estimate of the frequency offset over many time slots to generate an estimate of the offset of the transmission channel carrier adapted for use as a feedback signal to adjust carrier tracking; and a controllable frequency source adjustable to track the offset of the transmission channel carrier using the feedback signal.

7. The receiver of claim 6 wherein the means for generating an error measurement comprises means for generating a plurality of measures similar to the first measure of the degree to which the estimated channel impulse response matches the actual channel impulse response utilizing simultaneously recorded samples having different time offsets from the second memory wherein at least one sample used for each of the plurality of measures is advanced in time and one sample used for each of the plurality of measures is retarded in time relative to the samples used for generating the first measure; and wherein the means for determining comprises a filter for filtering the plurality of measures.

8. The receiver of claim 6 wherein the channel impulse response estimate generator comprises means for using variable tap coefficients that are determined estimates by estimating tap settings for the channel impulse response by minimizing the square of the difference between actual received samples and those synthesized by passing known transmitted signals through the estimated channel, and wherein the processing is done in an iterative manner by combining previous estimates of channel impulse response and new estimates thereof based on recent estimates, and by varying the ratio of the contributions from the previous and new estimates as a function of location within the time slot.

9. The method of claim 8 wherein the values of coefficients $K_1$ and $K_2$ are varied as a function of symbol location (k) by solving the following equations for (k+1) and $C_1(k+1)$:

$$C_{S0}(k+1) = C_{S0}(k) + K_1 \left[ z(k) - \sum_{n=0}^{1} C_n(k) \times \hat{a}(k-n) \right] \hat{a}^*(k)$$

$$C_{S1}(k+1) = C_{S1}(k) + K_1 \left[ z(k) - \sum_{n=0}^{1} C_n(k) \times \hat{a}(k-n) \right] \hat{a}^*(k-1)$$

$$C_0(k+1) = C_0(k) + C_{S0}(k+1) + K_2 \left[ z(k) - \sum_{n=0}^{1} C_n(k) \times \hat{a}(k-n) \right] \hat{a}^*(k)$$

$$C_1(k+1) = C_1(k) + C_{S1}(k+1) + K_2 \left[ z(k) - \sum_{n=0}^{1} C_n(k) \times \hat{a}(k-n) \right] \hat{a}^*(k-1),$$

where $C_0(k)$ and $C_1(k)$ are complex values of estimated channel impulse response taps, $C_{s0}(k)$ and $C_n(k)$ are complex intermediate values related to the estimated channel impulse response taps, permitting second order operation, $K_1$ and $K_2$ are the real gain values controlling the tracking rate of the channel impulse response estimation process, $z(k)$ are complex symbol spaced sampled outputs of a receiver matched filter, and $a(k)$ are complex estimated or known values of transmitted symbols.

10. In a digital communications receiver in which signals received sequentially within time slots of a transmission channel, having a carrier and an impulse response are sampled, a method for adjusting timing of the signal sampling and for tracking offset of the transmission channel carrier comprising the steps of:

storing samples of the sequentially received signals in a time sequential manner;

generating transmission channel impulse response estimates associated with the stored samples, the estimates having associated taps;

using variable tap coefficients that are determined by estimating tap settings for the estimated channel impulse response by minimizing the square of the difference between actual received samples and those synthesized by passing known transmitted signals through the estimated channel, the processing being done in an iterative manner by combining previous estimates of channel impulse response and new estimates thereof based on recent estimates, and by varying the ratio of the contributions from the previous and new estimates as a function of location within the time slot, the ratio being performed by varying the values of coefficients $K_1$ and $K_2$ as a function of symbol location (k) by solving the following equations for (k+1) and $C_1(k+1)$:

$$C_{S0}(k+1) = C_{S0}(k) + K_1 \left[ z(k) - \sum_{n=0}^{1} C_n(k) \times \hat{a}(k-n) \right] \hat{a}^*(k)$$

$$C_{S1}(k+1) = C_{S1}(k) +$$

$$K_1 \left[ z(k) - \sum_{n=0}^{1} C_n(k) \times \hat{a}(k-n) \right] \hat{a}^*(k-1)$$

$$C_0(k+1) = C_0(k) + C_{S0}(k+1) +$$

$$K_2 \left[ z(k) - \sum_{n=0}^{1} C_n(k) \times \hat{a}(k-n) \right] \hat{a}^*(k)$$

$$C_1(k+1) = C_1(k) + C_{S1}(k+1) +$$

$$K_2 \left[ z(k) - \sum_{n=0}^{1} C_n(k) \times \hat{a}(k-n) \right] \hat{a}^*(k-1),$$

where $C_0(k)$ and $C_1(k)$ are complex values of estimated channel impulse response taps, $C_{s0}(k)$ and $C_n(k)$ are complex intermediate values related to the estimated channel impulse response taps, permitting second order operation, $K_1$ and $K_2$ are the real gain values controlling the tracking rate of the channel impulse response estimation process, $z(k)$ are complex symbol spaced sampled outputs of a receiver matched filter, and $a(k)$ are complex estimated or known values of transmitted symbols;

generating from the samples an error measurement comprising a first measure of the degree to which a channel impulse response estimate matches the actual channel impulse response;

determining a sample time setting that minimizes the above error measurement and adjusting the timing of the signal sampling in accordance with the newly determined sample time setting;

recording at least two samples of at least one tap of a channel impulse response estimate at least one selected location within a time slot;

generating a frequency offset estimate from the phase difference in the time slot between the at least two samples using the recorded tap samples; and adjusting a controllable frequency source to track the offset of the transmission channel carrier in accordance with the frequency offset estimate.

11. The method of claim 10 wherein the step of generating a frequency offset estimate comprises:

generating frequency offset estimates for each of a plurality of time slots from the phase difference in each time slot between at least two samples of a single tap of a channel impulse response estimate; and combining this plurality of frequency offset estimates to generate a precise frequency offset estimate; and wherein the step of adjusting comprises adjusting to compensate for the precise frequency offset estimate.

12. The method of claim 11 wherein the step of generating frequency offset estimates comprises:

selecting a dominant tap;

using recorded tap samples from the dominant tap; and calculating a phase change using the recorded tap samples, yielding an estimate of the frequency offset.

13. The method of claim 11 wherein each time slot includes a preamble and a postamble and wherein the step of generating frequency offset estimates comprises:

estimating the location within the time slot at which any fade in power received over the channel is a maximum;

during the reception of each time slot, selecting the half of the time slot that does not include the estimated location of maximum power fade;

recording two samples of each of two taps of the channel impulse response estimates, the first tap being just after the preamble or in the postamble, depending upon the estimated location of maximum power fade, and the second tap being a predetermined number of symbols later or earlier, depending upon the estimated location of maximum power fade;

selecting a dominant tap;

using recorded settings for the selected dominant tap, calculating a phase change, yielding an estimate of the frequency offset; and filtering the estimate of the frequency offset over many time slots to generate an estimate of the carder offset adapted for use as a feedback signal to adjust carrier tracking.

14. The method of claim 11 wherein the step of combining the frequency offset estimates comprises applying f_offset_estimate$_{k+1}$=(1−$K_{fo}$)f_estimate$_k$+$K_{fo}$freq_observed, where freq_observed is derived from the observed phase change, the constant $K_{of}$ controls the convergence rate of the estimation process, f_offset_estimate$_k$ is the estimated frequency offset at time slot "k", and $K_{of}$ is a constant controlling the convergence rate of the frequency tracking.

15. The method of claim 10 further comprising:

estimating the location within the time slots at which a data value estimate error is most probable; and processing the stored samples, starting with the first received sample in a time slot and proceeding in a forward direction with respect to the time sequence in which the samples were stored, beyond the estimated most probable error location, using a preselected maximum likelihood sequence estimation procedure to generate estimates of data values transmitted in the time slots.

16. The method of claim 15 further comprising the steps of processing the stored samples, starting with the final received sample in the time slot and proceeding in a reverse direction with respect to the time sequence in which the samples were stored, beyond the estimated most probable error location, using the maximum likelihood sequence estimation procedure to generate estimates of the transmitted data values; and processing the estimates of the preceding processing steps to generate enhanced estimates of the values of the transmitted data sequence.

17. The method claim 16 wherein the step of processing the estimates comprises applying the transmission channel impulse response estimates to the maximum likelihood sequence estimation procedures for generating enhanced estimates.

18. A digital communications receiver in which signals received sequentially within time slots of a transmission channel having a carrier and an impulse response are sampled comprising:

a memory for storing samples of the sequentially received signals in a time sequential manner, each sample having an associated phase;

a channel impulse response estimate generator coupled to the memory, comprising means for using variable tap coefficients that are determined by estimating tap settings for the estimated channel impulse response estimates by minimizing the square of the difference between actual received samples and those synthesized by passing known transmitted signals through the estimated channel, wherein the processing is done in an iterative manner by combining previous estimates of channel impulse response and new estimates thereof based on recent estimates, and by varying the ratio of the contributions from the previous and new estimates as a function of location within the time slot by varying the values of coefficients $K_1$ and $K_2$ as a function of symbol location (k) by solving the following equations for (k+1) and $C_1(k+1)$:

$$C_{S0}(k+1) = C_{S0}(k) + K_1\left[z(k) - \sum_{n=0}^{1} C_n(k) \times \hat{a}(k-n)\right]\hat{a}^*(k)$$

$$C_{S1}(k+1) = C_{S1}(k) +$$

$$K_1\left[z(k) - \sum_{n=0}^{1} C_n(k) \times \hat{a}(k-n)\right]\hat{a}^*(k-1)$$

$$C_0(k+1) = C_0(k) + C_{S0}(k+1) +$$

$$K_2\left[z(k) - \sum_{n=0}^{1} C_n(k) \times \hat{a}(k-n)\right]\hat{a}^*(k)$$

$$C_1(k+1) = C_1(k) + C_{S1}(k+1) +$$

$$K_2\left[z(k) - \sum_{n=0}^{1} C_n(k) \times \hat{a}(k-n)\right]\hat{a}^*(k-1),$$

where $C_0(k)$ and $C_1(k)$ are complex values of estimated channel impulse response taps, $C_{s0}(k)$ and $C_n(k)$ are complex intermediate values related to the estimated channel impulse response taps, permitting second order operation, $K_1$ and $K_2$ are the real gain values controlling the tracking rate of the channel impulse response estimation process, z(k) are complex symbol spaced sampled outputs of a receiver matched filter, and a(k) are complex estimated or known values of transmitted symbols;

means coupled to the memory for generating from the stored samples an error measurement comprising a first measure of the degree to which a channel impulse response estimate matches the actual channel impulse response;

means for determining a sample time setting that minimizes the above error measurement and for adjusting the timing of the signal sampling in accordance with the newly determined sample time setting;

a second memory for recording at least two samples of at least one tap of a channel impulse response estimate at at least one selected location within a time slot;

means for generating a frequency offset estimate from the phase difference in the time slot between the at least two samples using the recorded tap samples; and a controllable frequency source adjustable to track the offset of the transmission channel carrier in accordance with the frequency offset estimate.

19. The receiver of claim 18 further comprising:

means coupled to the channel impulse response estimator for generating frequency offset estimates for each of a plurality of time slots from a phase difference in each time slot between at least two samples of a single tap of a channel impulse response estimate; and a filter for combining this plurality of frequency offset estimates to generate a precise frequency offset estimate, and wherein the frequency source is adjustable to compensate for the precise frequency offset estimate.

20. The receiver of claim 19 wherein each sample recorded in the second memory includes a preamble and a postamble and wherein the means for generating frequency offset estimates comprises:

a fade locator for estimating the location within the time slot at which any fade in power received over the channel is a maximum;

means for selecting the half of the time slot that does not include the estimated location of maximum power fade wherein the second memory records two samples of each of two taps of the channel impulse response estimates, the first tap being just after the preamble or in the postamble, depending upon the estimated location of maximum power fade, and the second tap being a predetermined number of symbols later or earlier, depending upon the estimated location of maximum power fade;

a dominant tap selector;

means for using recorded settings from the second memory for the selected dominant tap, calculating a phase change, yielding an estimate of the frequency offset; and a frequency offset filter for filtering the estimate of the frequency offset over many time slots to generate an estimate of the carrier offset adapted for use as a feedback signal to adjust carrier tracking.

21. In a digital communications receiver in which signals received sequentially within time slots of a transmission channel, having a carrier and an impulse response are sampled, a method for adjusting timing of the signal sampling and for tracking offset of the transmission channel carrier comprising the steps of:

storing samples of the sequentially received signals in a time sequential manner;

generating transmission channel impulse response estimates associated with the stored samples, the estimates having associated taps;

generating from the samples an error measurement comprising a first measure of the degree to which a channel impulse response estimate matches the actual channel impulse response;

determining a sample time setting that minimizes the above error measurement and adjusting the timing of the signal sampling in accordance with the newly determined sample time setting;

recording at least two samples of at least one tap of a channel impulse response estimate at at least one selected location within a time slot;

generating frequency offset estimates for each of a plurality of time slots from the phase difference in each time slot between at least two samples of a single tap of a channel impulse response estimate;

combining this plurality of frequency offset estimates to generate a precise frequency offset estimate by applying $f\_offset\_estimate_{k+1} = (1-K_{fo})\ f\_estimate_k + K_{fo} f\_req\_observed$, where freq_observed is derived from the observed phase change, the constant $K_{fo}$ controls the convergence rate of the estimation process, $f\_offset\_estimate_k$ is the estimated frequency offset at time slot "k", and $K_{of}$ is a constant controlling the convergence rate of the frequency tracking; and adjusting a controllable frequency source to track the offset of transmission channel carrier in accordance with the precise frequency offset estimate.

22. The method of claim 21 wherein the step of determining a sample time setting comprises generating a plurality of measures similar to the first measure of the degree to which the estimated channel impulse response matches the actual channel impulse response utilizing simultaneously recorded samples having different time offsets wherein at least one sample used for each of the plurality of measures is advanced in time and one sample used for each of the plurality of measures is retarded in time relative to the samples used for generating the first measure, and further comprising filtering the plurality of measures.

23. The method of claim 21 wherein the step of generating frequency offset estimates comprises:
   selecting a dominant tap;
   using recorded tap samples from the dominant tap; and
   calculating a phase change using the recorded tap samples, yielding an estimate of the frequency offset.

24. The method of claim 21 wherein each time slot includes a preamble and a postamble and wherein the step of generating frequency offset estimates comprises:
   estimating the location within the time slot at which any fade in power received over the channel is a maximum;
   during the reception of each time slot, selecting the half of the time slot that does not include the estimated location of maximum power fade;
   recording two samples of each of two taps of the channel impulse response estimates, the first tap being just after the preamble or in the postamble, depending upon the estimated location of maximum power fade, and the second tap being a predetermined number of symbols later or earlier, depending upon the estimated location of maximum power fade;
   selecting a dominant tap;
   using recorded settings for the selected dominant tap, calculating a phase change, yielding an estimate of the frequency offset; and
   filtering the estimate of the frequency offset over many time slots to generating an estimate of the carrier offset adapted for use as a feedback signal to adjust carrier tracking.

25. The method of claim 21 wherein the step of generating channel impulse response estimates comprises using variable tap coefficients that are determined by estimating tap settings for the estimated channel impulse response by minimizing the square of the difference between actual received samples and those synthesized by passing known transmitted signals through the estimated channel, and wherein the processing is done in an iterative manner by combining previous estimates of channel impulse response and new estimates thereof based on recent estimates, and by varying the ratio of the contributions from the previous and new estimates as a function of location within the time slot.

26. The method of claim 25 wherein the values of coefficients $K_1$ and $K_2$ are varied as a function of symbol location (k) by solving the following equations for (k+1) and $C_1(k+1)$:

$$C_{S0}(k+1) = C_{S0}(k) + K_1\left[ z(k) - \sum_{n=0}^{1} C_n(k) \times \hat{a}(k-n) \right]\hat{a}^*(k)$$

$$C_{S1}(k+1) = C_{S1}(k) +$$
$$K_1\left[ z(k) - \sum_{n=0}^{1} C_n(k) \times \hat{a}(k-n) \right]\hat{a}^*(k-1)$$

$$C_0(k+1) = C_0(k) + C_{S0}(k+1) +$$
$$K_2\left[ z(k) - \sum_{n=0}^{1} C_n(k) \times \hat{a}(k-n) \right]\hat{a}^*(k)$$

$$C_1(k+1) = C_1(k) + C_{S1}(k+1) +$$
$$K_2\left[ z(k) - \sum_{n=0}^{1} C_n(k) \times \hat{a}(k-n) \right]\hat{a}^*(k-1),$$

where $C_0(k)$ and $C_1(k)$ are complex values of estimated channel impulse response taps, $C_{s0}(k)$ and $C_n(k)$ are complex intermediate values related to the estimated channel impulse response taps, permitting second order operation, $K_1$ and $K_2$ are the real gain values controlling the tracking rate of the channel impulse response estimation process, z(k) are complex symbol spaced sampled outputs of a receiver matched filter, and a(k) are complex estimated or known values of transmitted symbols.

27. The method of claim 21 further comprising:
   estimating the location within the time slots at which a data value estimate error is most probable; and
   processing the stored samples, starting with the first received sample in a time slot and proceeding in a forward direction with respect to the time sequence in which the samples were stored, beyond the estimated most probable error location, using a preselected maximum likelihood sequence estimation procedure to generate estimates of data values transmitted in the time slots.

28. The method of claim 27 further comprising the steps of processing the stored samples, starting with the final received sample in the time slot and proceeding in a reverse direction with respect to the time sequence in which the samples were stored, beyond the estimated most probable error location, using the maximum likelihood sequence estimation procedure to generate estimates of the transmitted data values; and
   processing the estimates of the preceding processing steps to generate enhanced estimates of the values of the transmitted data sequence.

29. The method claim 28 wherein the step of processing the estimates comprises applying the transmission channel impulse response estimates to the maximum likelihood sequence estimation procedures for generating enhanced estimates.

* * * * *